(12) United States Patent
Imamura (10) Patent No.: US 8,998,352 B2
(45) Date of Patent: Apr. 7, 2015

(54) VEHICLE BRAKE CONTROL DEVICE FOR AN ELECTRICALLY DRIVEN VEHICLE

(75) Inventor: Masayuki Imamura, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 148 days.

(21) Appl. No.: 13/820,114

(22) PCT Filed: Sep. 30, 2011

(86) PCT No.: PCT/JP2011/072601
§ 371 (c)(1),
(2), (4) Date: Feb. 28, 2013

(87) PCT Pub. No.: WO2012/063572
PCT Pub. Date: May 18, 2012

(65) Prior Publication Data
US 2013/0154344 A1    Jun. 20, 2013

(30) Foreign Application Priority Data

Nov. 8, 2010   (JP) ................. 2010-249877

(51) Int. Cl.
| | |
|---|---|
| B60T 8/64 | (2006.01) |
| B60T 8/17 | (2006.01) |
| B60T 8/1755 | (2006.01) |
| B60T 8/40 | (2006.01) |
| B60T 8/48 | (2006.01) |
| B60T 13/20 | (2006.01) |
| B60T 13/58 | (2006.01) |
| B60W 10/08 | (2006.01) |
| B60W 30/18 | (2012.01) |

(52) U.S. Cl.
CPC ............. *B60T 8/17* (2013.01); *B60T 8/1755* (2013.01); *B60T 8/4045* (2013.01); *B60T 8/4872* (2013.01); *B60T 13/20* (2013.01); *B60T 13/586* (2013.01); *B60W 10/08* (2013.01); *B60W 30/18127* (2013.01); *B60T 2270/604* (2013.01)

(58) Field of Classification Search
USPC ........... 303/151, 152, 2, 3, 167, 114.1, 115.4, 303/115.5; 70/70, 71, 78, 82, 83; 701/70, 701/71, 78, 82, 83
See application file for complete search history.

(56) References Cited

U.S. PATENT DOCUMENTS

| | | | |
|---|---|---|---|
| 8,366,210 B2 * | 2/2013 | Maki et al. .................... 303/151 |
| 8,523,297 B2 * | 9/2013 | Morishita ..................... 303/151 |
| 2010/0222978 A1 * | 9/2010 | Kodama et al. ................ 701/70 |

FOREIGN PATENT DOCUMENTS

| | | |
|---|---|---|
| JP | 9-11875 A | 1/1997 |
| JP | 2000-280890 A | 10/2000 |
| JP | 2002-331925 A | 11/2002 |
| JP | 2006-96218 A | 4/2006 |

* cited by examiner

*Primary Examiner* — Nicholas J Lane
(74) *Attorney, Agent, or Firm* — Global IP Counselors, LLP (57) ABSTRACT

A vehicle brake control device includes a master cylinder, a plurality of wheel cylinders, a VDC brake hydraulic pressure unit, a motor controller and an integration controller. When a brake operation is carried out, the integration controller carries out a regenerative brake control which achieves a target deceleration. Additionally, a motor suspension control is carried out which suspends a drive status of the VDC motor when the vehicle velocity is less than a first prescribed value. Furthermore, when the vehicle velocity exceeds a second prescribed value and the brake operation is carried out while the VDC motor is in the suspended status, the value of the target deceleration is set to a lower value than the value of the target deceleration which the driver requests, and a motor reactivation control is carried out which reactivates the VDC motor.

4 Claims, 8 Drawing Sheets

VEHICLE BRAKE CONTROL DEVICE FOR AN ELECTRICALLY DRIVEN VEHICLE

CROSS-REFERENCE TO RELATED APPLICATIONS

This application is a U.S. National stage application of International Application No. PCT/JP2011/072601, filed Sep. 30, 2011, which claims priority claims priority under to Japanese Patent Application No. 2010-249877, filed on Nov. 8, 2010, the entire contents of which is hereby incorporated by reference.

BACKGROUND OF THE INVENTION

1. Field of the Invention

The present invention relates to a brake control device for an electrically driven vehicle such as hybrid vehicle and the like with a regenerative corporative brake control in which a target deceleration is achieved by the sum of a base hydraulic pressure portion and a regenerative portion, and the shortage of the regenerative portion is supplemented or compensated for by an increased pressure in the base hydraulic pressure as an add-on pressure portion.

2. Background Information

Conventionally, when braking, such a brake device for vehicle is known with a regenerative collaborative brake control in which the target deceleration required by the drive is achieved by the sum of the base hydraulic pressure portion and the regenerative portion, and the shortage in regenerative portion will be compensated for as the add-on pressure portion by an increased amount of the base hydraulic pressure (see for example Japanese Laid-Open Patent Application Publication No. 2006-96218).

In this conventional device, through the control of a differential valve disposed between a master cylinder and each wheel cylinder and the operation of a hydraulic pressure pump for a pump-up pressure increase, a wheel cylinder pressure is generated that is higher than the master cylinder pressure to set this differential pressure as the add-on pressure portion. In addition, in a situation where such an increase by the add-on pressure portion is unnecessary, the operation of the pumping motor will be stopped.

SUMMARY

However, in a vehicle equipped with a conventional brake device, in a state where operation of the pumping motor is stopped below a predetermined vehicle speed (approximately zero) and thus a pressure increase is prohibited, such a scene (such as on congested roads or when parking in) may be assumed in which a gentle or moderate braking is performed while travelling at an extremely low speed such as in a creeping movement after the deactivation of the motor.

In such a scene like this, when no pressure increase is initiated while holding the pumping motor stopped, the total brake force with respect to a brake pedal stroke will be different from normal, thus deteriorating a "feeling of G control". In order to solve this problem, it may be suggested that, when braking operation is made during a stationary state of the pumping motor, the pumping motor will be operated again to maintain the same brake feel as thus far. However, in this assumed scene, the required hydraulic pressure is low because of gentle braking operation, and the rotation speed of motor may reach an over-rotation temporarily during transition from zero to the target rotation speed. Therefore, the actual hydraulic pressure develops an overshoot compared to the required hydraulic pressure, and temporarily causes the brake force in excess of the required brake force (deceleration). As a result, the problem of awkward feeling in braking (discontinuous brake feel) is encountered.

The present invention has been made by focusing on the problems described above, and has the object to provide a brake control device that may suppress the discontinuous brake feel and thus giving rise to easiness to handle to the driver when generating a brake force by restarting the pumping motor stopped.

To achieve the above object, the brake control device for an electrically driven vehicle according to the present invention is provided with a master cylinder, a wheel cylinder, a brake hydraulic pressure actuator, a regenerative brake force control unit, a regenerative cooperative brake control unit, a motor stop control unit and a motor restart control unit. The master cylinder generates a master cylinder pressure in accordance with a braking operation. The wheel cylinder is disposed at each front and rear wheel and supplies a hydraulic pressure braking power to each wheel. The brake hydraulic pressure actuator is interposed between the master cylinder and wheel cylinder and is provided with a hydraulic pressure pump driven by a pumping motor and a differential valve for controlling the pressure difference between the wheel cylinder pressure and master cylinder pressure when the pumping motor is in operation. The regenerative brake force control unit is connected to an electric drive motor for travelling coupled to the drive wheel and controls the regenerative brake force that is generated by the electric drive motor. The regenerative cooperative brake control unit achieves the target deceleration at the braking operation by the sum of a base hydraulic pressure portion by the master cylinder pressure and a regenerative portion by the regenerative brake force, and further compensates for the shortage of the regenerative portion by an add-on pressure portion by the brake hydraulic pressure actuator. The motor stop control unit stops the pumping motor in operation when the vehicle speed falls below a first predetermined vehicle speed. The motor restart control unit sets the target deceleration value lower than the target deceleration of driver's request and restarts the pumping motor when the vehicle speed exceeds a second predetermined vehicle speed and brake is operated.

Thus, in the state in which the pumping motor is stopped, the vehicle speed exceeds the second predetermined vehicle speed, and upon braking operation, the motor restart control unit sets the target deceleration value lower than the target deceleration value of driver's request and restarts the pumping motor. Subsequently, the regenerative cooperative braking control unit carries out control to achieve the set target deceleration value by the sum of base hydraulic pressure portion, regenerative portion and add-on pressure portion. For example, in such a scene in which, after deactivation of the pumping motor, when restarting the pumping motor in response to a gentle or slow braking operation while advancing at extremely low speed, the required hydraulic pressure is low and the actual hydraulic pressure generated by the add-on pressure portion may develop an overshoot temporarily. In contrast, in the scene to restart after deactivation of pumping motor, since the target deceleration value is preset in advance lower than the target deceleration value the driver requires, the sharing ratio or apportionment in the deceleration attributable to the add-on pressure portion is thus lowered. Therefore, the steep deceleration by the transitional over-driving of the pumping motor is prevented to occur, and the vehicle deceleration may be made to the extent to correspond to the target deceleration of the driver request. Consequently, when restarting the stationary pumping motor to generate brake force, the discontinuous brake feel is suppressed while obtaining the brake that is easy to handle.

BRIEF DESCRIPTION OF THE DRAWINGS

Now, reference will be made to the drawings, which form a part of this original disclosure.

DETAILED DESCRIPTION OF THE EMBODIMENTS

Hereinafter, the best configuration to implement the brake control device for electrically driven vehicle according to the present invention will be described with reference to the first embodiment shown in the drawings.

First Embodiment

Figure 1:
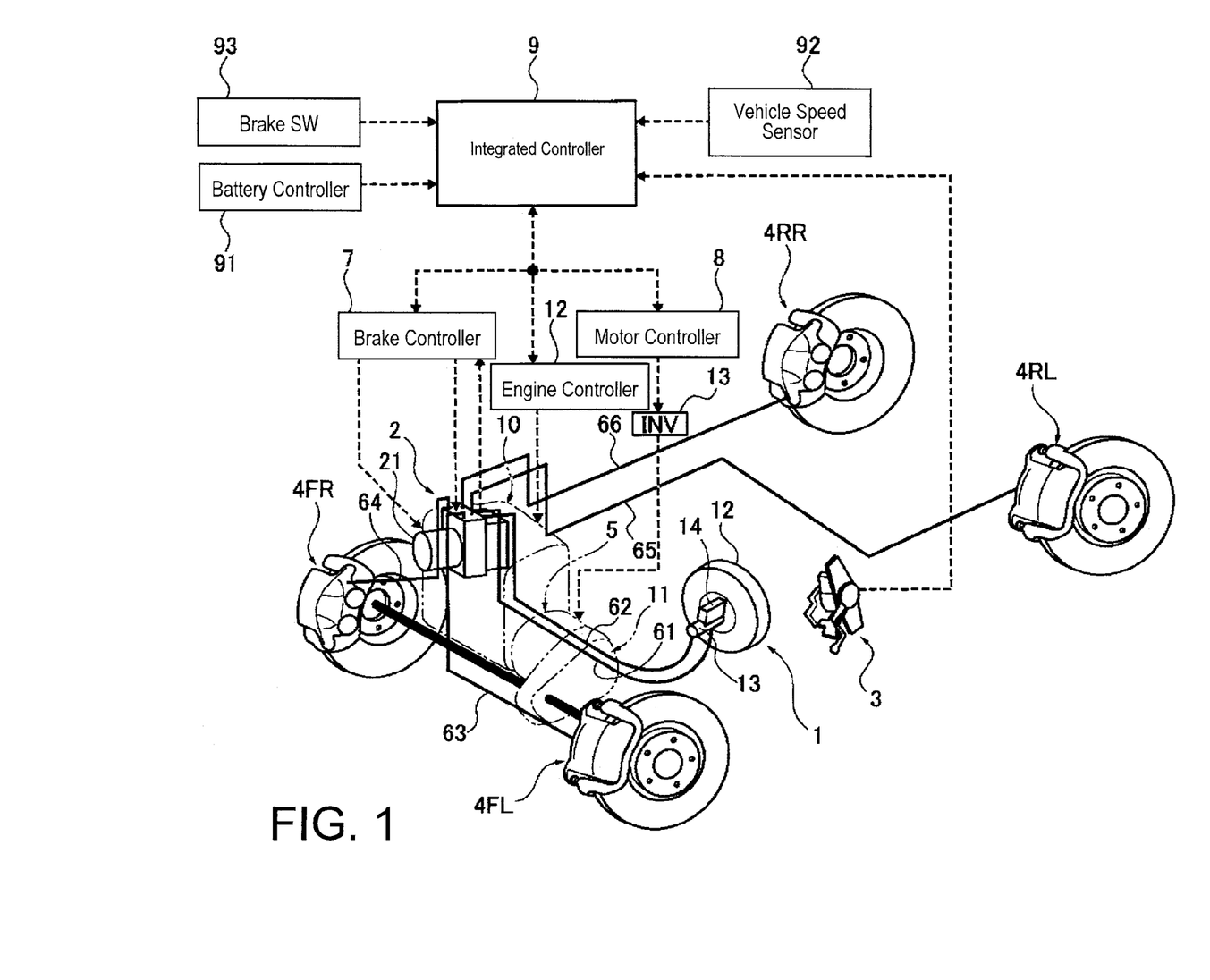
FIG. 1 is a schematic view showing a brake system of a hybrid electric vehicle (HEV) of the front wheel drive to which a brake control device according to embodiments of the invention can be applied.
Figure 2:
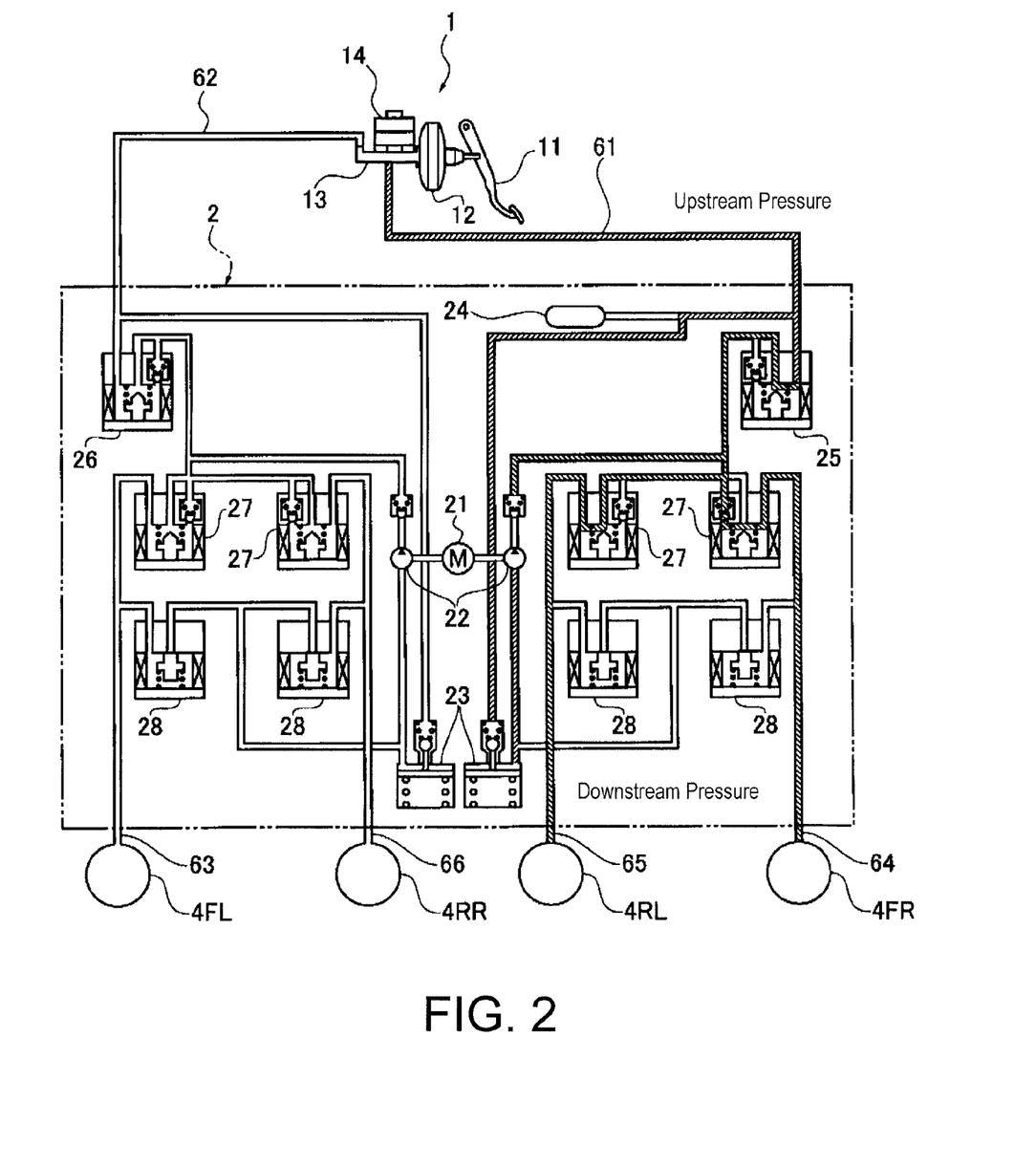
FIG. 2 is a view showing a brake hydraulic pressure circuit including a VDC brake hydraulic pressure unit in the brake device according to a first embodiment of the invention.

First, the configuration will be described. FIG. 1 shows a system configuration of a hybrid electric vehicle (example of electrically driven vehicle) of a front wheel drive type to which a brake control system according to the first embodiment of the present invention can be applied. FIG. 2 illustrates a VDC brake hydraulic pressure unit (example of brake fluid or hydraulic pressure actuator). Below is an explanation of the brake system configuration with references to FIGS. 1 and 2.

A brake deceleration generating mechanism of the brake control system according to first embodiment includes, as shown in FIG. 1, a brake fluid pressure generating unit 1, a VDC brake fluid pressure unit 2 (also called as a brake fluid pressure actuator), a stroke sensor 3, a left front wheel cylinder 4FL, a right front wheel cylinder 4FR, a left rear wheel cylinder 4RL, a right rear wheel cylinder, and an electric drive motor 5 for vehicle propulsion or travelling.

The brake deceleration generation system in the first embodiment is a regenerative cooperative brake system that uses a vehicle dynamics control (VDC) system in a vehicle currently available and incorporated for a regenerative cooperation in the actual vehicle. The VDC system is generally intended for vehicle behavior control (=VDC control) and copes with the disruption in vehicle behaviors such as entering a corner at high speed and/or quick manipulation of the steering wheel, avoids lateral slipping and provides a good running stability. For example, if the VDC control is implemented to a vehicle running in a corner where an oversteer tendency is detected, a wheel at the front and outer side of corner will be braked. When cornering behavior indicates an understeer tendency, vehicle propulsion power will be reduced and a wheel at the rear and inner side of the corner will be braked.

The brake fluid pressure generating unit 1 generates a base brake fluid pressure in accordance with the driver's operation of a brake pedal. As shown in FIGS. 1 and 2, the brake fluid pressure generating unit 1 includes a brake pedal 11, a vacuum booster 12, a master cylinder 13 and a reservoir tank 14. A brake pressure generated by the driver applying brake pedal 11 is amplified by the vacuum booster 12, and a primary fluid pressure and a secondary fluid pressure will be generated by the master cylinder 13. Here it should be appreciated that brake deceleration generated by the master cylinder 13 should be set to be smaller than the target deceleration of driver demand.

The VDC brake fluid pressure unit 2 is interposed between the brake fluid pressure generating unit 1 and the wheel cylinders 4FL, 4FR, 4RL and 4RR associated with respective wheels. The VDC brake fluid pressure unit 2 is a brake fluid pressure actuator, and has a fluid pressure pumps 22 driven by a VDC motor 21 (pumping motor), which is a dedicated electric motor. The VDC brake fluid pressure unit 2 increases, maintains or reduces a pressure from the master cylinder 13. Moreover, the VDC brake fluid pressure unit 2 and the brake fluid pressure generating unit 1 are connected to each other via a primary fluid conduit 61 and a secondary fluid conduit 62. The VDC brake fluid pressure unit 2 is connected to each of the wheel cylinders 4FL, 4FR, 4RL and 4RR through a left front wheel fluid conduit 63, a right front fluid conduit 64, a left rear wheel fluid conduit 65 and a right rear wheel fluid conduit 66, respectively. This way, when the driver depresses the brake pedal 11, a master cylinder pressure generated at brake fluid pressure generating unit 1 will further be raised by the VDC fluid unit 2 and introduced into respective ones of the wheel cylinders 4FL, 4FR, 4RL, 4RR to exert a braking operation.

The VDC brake fluid generation unit 2 is detailed in FIG. 2 and has the fluid pressure pumps 22 driven by the VDC motor 21, a pair of reservoirs 23 and a master cylinder pressure sensor 24 for detecting an actual master cylinder pressure.

Various solenoid valves are employed including a first master cylinder (M/C) cutoff solenoid valve 25 (e.g., a differential pressure valve), a second M/C cutoff solenoid valve 26 (e.g., a differential pressure valve), a plurality of pressure holding solenoid valves 27 and a plurality of pressure reduction solenoid valves 28. Both the first M/C cut solenoid valve 25 and the secondary M/C cutoff solenoid valve 26 control, under operation of the VDC motor 21, a pressure difference developed between a wheel cylinder pressure (downstream pressure) and a master cylinder pressure (upstream pressure).

The stroke sensor 3 is provided to detect an operation amount or stroke by a driver. This stroke sensor 3 is added to the conventional VDC system to detect a target deceleration amount, i.e., a driver demanding deceleration level, for use in regenerative cooperative brake control.

The respective wheel cylinders 4FL, 4FR, 4RL, 4RR are each provided at an associated brake disk for front or rear wheels, and each is supplied with a controlled hydraulic pressure. When the fluid pressure is applied to each of the wheel cylinders 4FL, 4FR, 4RL and 4RR, the brake rotors or disks are clamped by brake pads to apply a friction force therebetween, which in turn results in a hydraulic brake force to wheels.

The electric drive motor 5 is provided as a driving source for driving wheels (left and right front wheels 4FL, 4FR in this example) and functions as both a driving motor and a generator. The electric drive motor 5 transfers a driving force or torque to the driving wheels when driven by energy from the battery. Moreover, in a regenerative mode, the motor applies load to left and right front wheels, and thus, recovers kinetic energy through regenerative braking to charge the battery. The drive train of left and right front wheels (drive wheels), in which this electric drive motor 5 is interposed, is provided with an engine 10 for drive source to travel and driving force is transmitted via transmission 11 to left and right wheels.

As shown in FIG. 1, the brake deceleration control system of the brake control device of the first embodiment is provided, as shown in FIG. 1, with a brake controller 7, a motor controller 8 (regenerative brake force control unit), an integrated controller 9 and an engine controller 12.

During regenerative cooperative braking control, the brake controller 7 receives a fluid pressure command from the integrated controller 9 and pressure information from master cylinder pressure sensor 24 of the VDC brake fluid pressure unit 2. Then, in accordance with a predetermined control rule, drive commands for the solenoid valves 25, 26, 27 and 28, and for the VDC motor 21 of VDC brake fluid pressure unit 2 are output. In addition to the regenerative cooperative brake control, a VDC control, an ABS control and a TCS control are performed by this brake controller 7 in addition to the regenerative cooperation brake control.

The motor controller 8 is connected via an inverter 13 to the electric drive motor 5, which in turn is connected to the left and right front wheels as driving wheels. During the regenerative brake control, upon receipt of a regenerative braking command from the integrated controller 9, the regenerative brake force generated by the electric drive motor 5 is controlled by the motor controller as the regenerative brake force control unit in accordance with input command. This motor controller 8 also functions to control the motor torque or motor rotation speed generated from the electric drive motor 5 depending on the running conditions or vehicle conditions during travelling.

During braking operation, the integrated controller 9 achieves the target deceleration by the sum of a base fluid pressure portion due to the master cylinder pressure and a regenerative portion from the regenerative brake force, and an add-on portion by the VDC fluid pressure unit that compensates for a shortage of the regenerative portion. This integrated controller 9 receives battery charge capacity information from a battery controller 91, the vehicle speed information from a vehicle speed sensor 92, the braking operation information from a brake switch 93, the brake pedal operation amount information from the stroke sensor 3, the master cylinder pressure information from the master cylinder pressure sensor 24, and the like. As the vehicle speed sensor 92, such wheel speed detecting unit is used for detecting rotation speed extending up to extremely low vehicle speed region.

Figure 3:
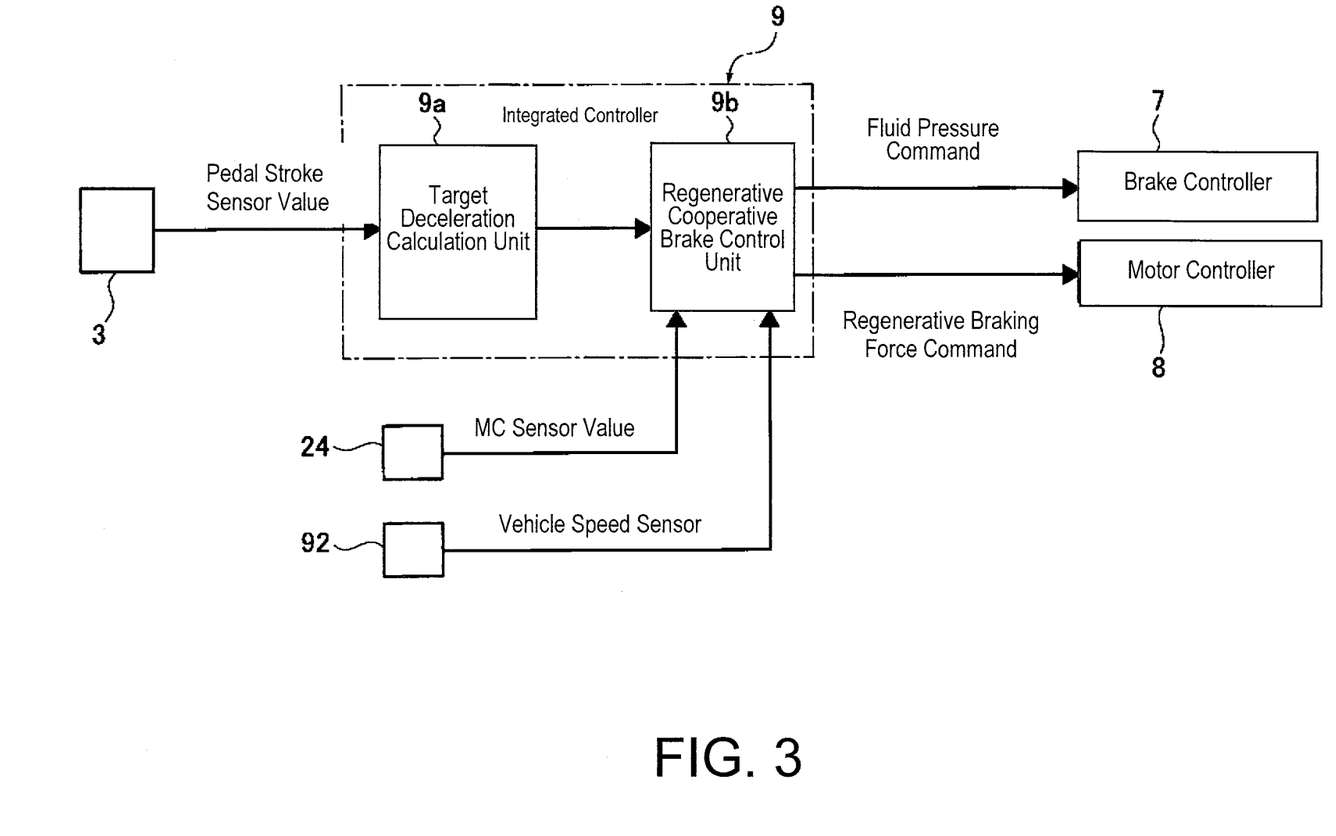
FIG. 3 is a control block diagram showing a regenerative cooperative or ordinate brake device according to the first embodiment.

FIG. 3 shows a regenerative cooperative brake control system of the first embodiment. Description is now made of the basic configuration of the regenerative cooperative brake control with reference to FIG. 3. As shown in FIG. 3, the regenerative cooperative brake control system of the first embodiment is provided with the brake controller 7, the motor controller 8, and the integrated controller 9.

The integrated controller 9 has a target deceleration calculation unit 9a and a regenerative cooperative brake control unit 9b. Based on the pedal stroke sensor value from the stroke sensor 3, the target deceleration calculation unit 9a calculates a target deceleration. The regenerative cooperative brake control unit 9b receives the target deceleration from the target deceleration calculation unit 9a, a MC pressure sensor value from the master cylinder pressure sensor 24, and a vehicle speed value from the vehicle speed sensor 92, determines the base fluid pressure based on the MC sensor value, determines the regenerative portion and the add-on pressure portion, respectively, and performs a regenerative cooperative brake control calculation to achieve the target deceleration by the sum of the base fluid pressure portion, the regenerative portion and the add-on pressure portion. Following this calculation result, the fluid pressure command corresponding to the add-on pressure portion will be output to the brake controller 7 and the regenerative brake force command corresponding to the regenerative portion to the motor controller 8, respectively.

Figure 4:
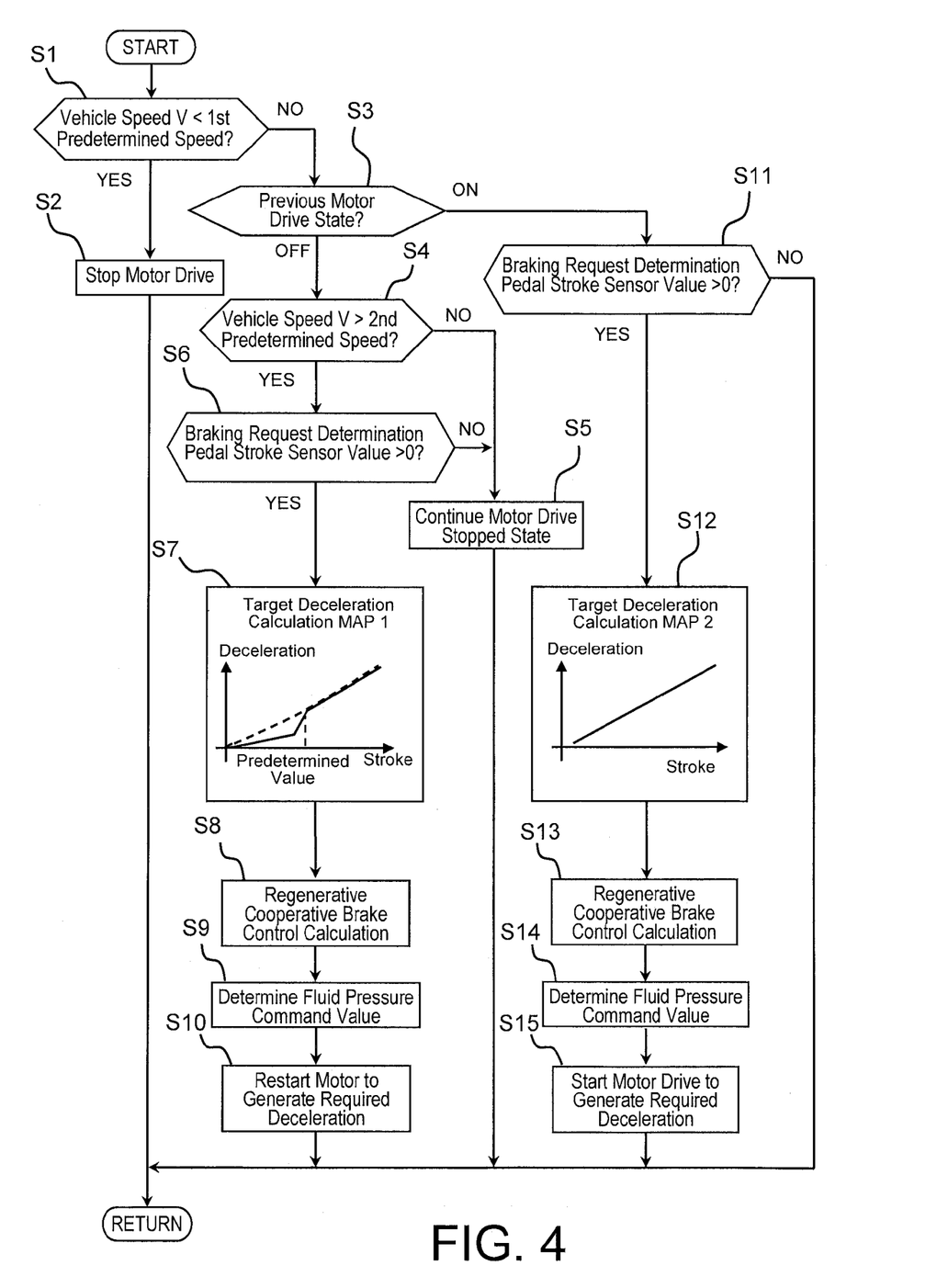
FIG. 4 is a flow chart showing the configuration and flow of the regenerative cooperative brake control process executed by the integrated controller in the brake control device of the first embodiment.

FIG. 4 is a flow chart showing the configuration and flow of the regenerative cooperative brake control process executed by the integrated controller in the brake control device of the first embodiment (regenerative cooperative brake control unit). Description of each step in FIG. 4 is now made below.

In step S1, determination is made whether or not vehicle speed V is less than a first predetermined value (first predetermined vehicle speed). If YES (vehicle speed V<<the first predetermined value), control proceeds to step S2, while if NO (the vehicle speed V≥the first vehicle speed), then the control proceeds to step S3, respectively. Here, "the first predetermined value (first predetermined vehicle speed)" is set to assume the value in the extremely low vehicle speed region immediately before the vehicle stops.

In step S2, following the determination that the vehicle speed V<the first predetermined value (first predetermined vehicle speed) in step S1, the VDC motor 21 is stopped to be driven, and process returns.

In step S3, after determining that the vehicle speed value V≥the first predetermined value (first predetermined vehicle speed), the previous motor driven status of the VDC motor 21 is determined. If ON (motor driven state), then the control proceeds to step S11, if NO (motor stopped state) control proceeds to step S4.

In step S4, following the determination of the motor stopped state (OFF) in step S3, a determination is made whether or not vehicle speed V exceeds a second predetermined value (second predetermined vehicle speed). If YES, i.e., vehicle speed V>the second predetermined value, control proceeds to step S6, if NO, i.e., vehicle speed V≤the second predetermined value, then the control proceeds to step S5. Here, the "second predetermined value (second predetermined vehicle speed)" meets the relationship that the first predetermined value (first predetermined vehicle speed) is smaller than the second predetermined value (second predetermined vehicle speed), and is thus assumed to take a greater value than the first predetermined value (first predetermined vehicle speed). Having the two values different from each other this way is because of preventing the ON/OFF hunting of the DC motor 21.

In step S5, following the determination that vehicle speed V is equal to or smaller than the second predetermined value (second predetermined vehicle speed) or the determination that the pedal stroke sensor value is equal to zero, the motor drive stopped state of the VDC motor 21 will be continued and control returns.

In step S6, following the determination that vehicle speed V>the second predetermined value (second predetermined vehicle speed), a braking request determination, i.e., whether or not the pedal stroke sensor value exceeds zero. If YES, i.e., pedal stroke sensor value is greater than zero, control proceeds to step S7, while if NO (pedal stroke sensor value is equal to zero), then the control proceeds to step S5.

In step S7, following the determination that pedal stroke sensor value is greater than zero in step S6, based on the brake pedal stroke and the first target deceleration calculation map (described in the framework of step S7), the target deceleration in accordance with brake pedal stroke is calculated and control proceeds to step S8. Here, with respect to the first target deceleration calculating map, the regional or domain characteristic of the map characteristic between the stroke and a target deceleration below the first predetermined value of the vehicle speed V (first predetermined vehicle speed) is set to somewhat lower than the second target deceleration calculation map (as described within a block of step S12) that is used when the vehicle speed V exceeds the first predetermined value (first predetermined vehicle speed). In this connection, the decrease width or range of reduction is defined by subtracting at least the overshoot of actual deceleration due to over-revolution of the VDC motor 21 from the second target deceleration calculation map (described within the block of step S12) for obtaining the target deceleration of driver request.

In step S8, following the calculation of the target deceleration in step S7, the base fluid pressure portion is determined based on the MC pressure sensor value, the regenerative portion and add-on pressure portion are determined based on vehicle sensor value, and the regenerative cooperative brake control calculation to achieve the target deceleration by the sum of the base fluid pressure portion, the regenerative portion and the add-on pressure portion, then control proceeds to step S9.

In step S9, following the regenerative cooperative brake control calculation in step S8, process determines a fluid pressure command value corresponding to the add-on pressure portion, outputs a fluid pressure command to obtain the fluid pressure command value to the controller 7, and advances to step S10. At this time, when the regenerative portion is necessary, the process determines a regenerative brake force command value and outputs the regenerative brake force command to obtain the regenerative brake force command value to the motor controller 8.

In step S10, following the determination of the fluid pressure command value in step S9, process is started to resume the drive of the VDC motor 21 to generate the necessary deceleration by the sum of the base fluid pressure portion, regenerative portion and the add-on portion, and the control returns.

In step S11, following the determination of motor driven condition (ON) in step S3, control performs a braking request determination, i.e., whether or not the pedal stroke sensor value exceeds zero. If YES (i.e., pedal stroke sensor value>zero), control proceeds to step S12, while if NO (pedal stroke sensor value=0), the control returns.

In step S12, following the determination in step 11 of pedal stroke sensor value being greater than zero, process calculates a target deceleration corresponding to the brake pedal stroke based on brake pedal stroke and the second target deceleration calculation map (i.e. the map described within the block of step S12, and proceeds to step S13.

It should be noted that the second target deceleration calculation map sets a deceleration represented by the brake pedal stroke caused by the driver, i.e., the deceleration required by the driver as the target deceleration, and defines the target deceleration map characteristic to obtain this target deceleration.

In step S13, following the determination of the target deceleration in step S12, the process determines the base fluid pressure portion based on the MC pressure sensor value, determines the regenerative portion and add-on portion based on the vehicle speed sensor value, performs the regenerative cooperative brake control calculation to obtain the target deceleration by the sum of base fluid pressure portion, regenerative portion, and add-on portion, and finally proceeds to step S14.

In step S14, following the regenerative cooperative brake control calculation in step S13, control determines the fluid pressure command value corresponding to the add-on portion, outputs the fluid pressure command to obtain the fluid pressure command value to the brake controller 7, and advances to step S15. At this time if the regenerative portion is required, control determines the regenerative brake force command value corresponding to the regenerative portion and outputs the regenerative brake command to the motor controller 8 to obtain the regenerative brake force command value.

In step S15, following the determination of the fluid pressure command value in step S14, process drives the VDC motor 21, generates the required deceleration by the sum of base fluid pressure portion, regenerative portion, and add-on portion, and returns.

Now, description is made of the operations. First, description is made for "regenerative brake system using VDC". Subsequently, with respect to the operation of the brake control device of the hybrid vehicle in the first embodiment, descriptions are made separately by dividing into "operation of regenerative cooperative brake control when vehicle speed V is equal to or greater than first predetermined value (first predetermined vehicle speed)", "operation of motor stop control when vehicle speed V is smaller than first predetermined value (first predetermined vehicle speed)", and "operation of regenerative cooperative brake control in a braking operating scene accompanied by motor restart".

The regenerative cooperative brake control is intended, when such a scene arises in which the sum of base fluid pressure portion and regenerative portion does not fully fulfill the deceleration of driver request, to pressurize a fluid pressure of shortage by the VDC brake fluid pressure unit to achieve the deceleration the driver requires. Regarding the regenerative cooperative brake system using the VDC to perform this regenerative cooperative brake control, description is now made based on FIGS. 5 to 8.

Figure 5:
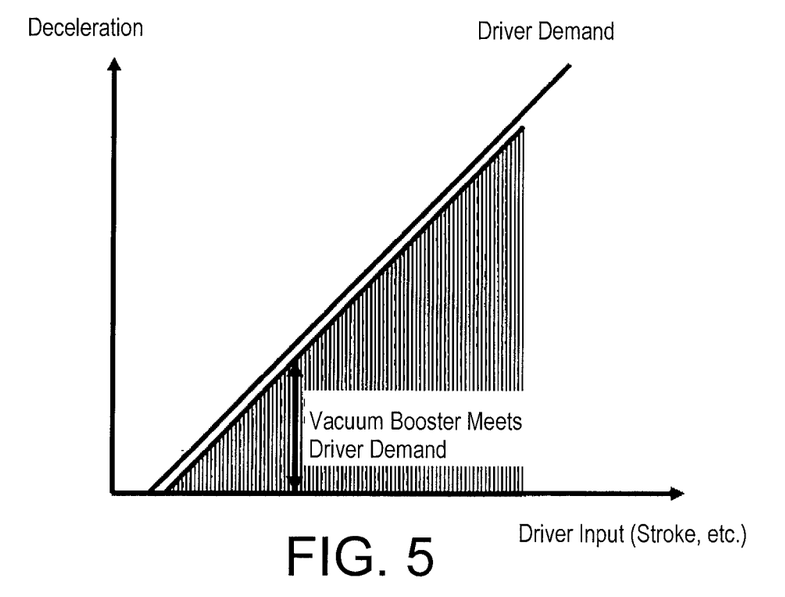
FIG. 5 is a deceleration characteristic diagram showing the relationship between driver input and deceleration when the driver requests a target deceleration by the negative pressure booster at the braking operation.
Figure 6:
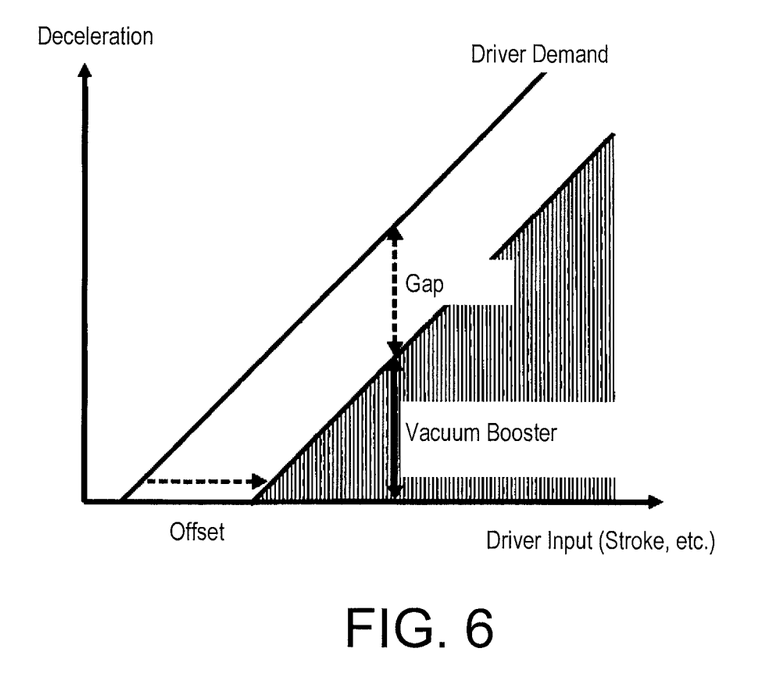
FIG. 6 is a deceleration characteristic diagram showing the relationship between driver input and deceleration so as to generate a base hydraulic pressure by vacuum booster in response to braking operation as modified by an offset gap with respect to the deceleration of driver request.
Figure 7:
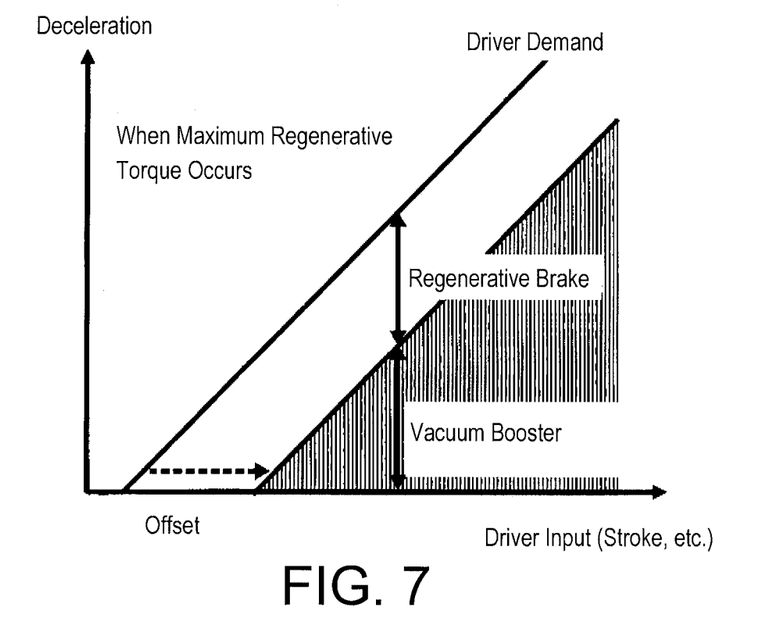
FIG. 7 is a deceleration characteristic diagram showing the relationship between driver input and deceleration when generating the maximum regenerative torque where the deceleration of driver request is compensated for by vacuum booster and regenerative brake.

First, in the case of the existing conventional VDC, as shown in FIG. 5, at the time of braking operation, the deceleration of driver request is configured to be met by the base fluid pressure portion due to the vacuum or negative pressure booster. In comparison, as shown in FIG. 6, a gap of deceleration is provided by offsetting the deceleration of driver request so that the base fluid pressure portion would not reach the deceleration of driver request at braking operation. Thus, the gap of deceleration is representative of the shortage with respect to the deceleration of driver request. Thus, as shown in FIG. 7, at generation of maximum regenerative torque, the deceleration of driver demand will be compensated for by the sum of vacuum booster (base fluid pressure portion) and regenerative brake (regenerative portion).

Figure 8:
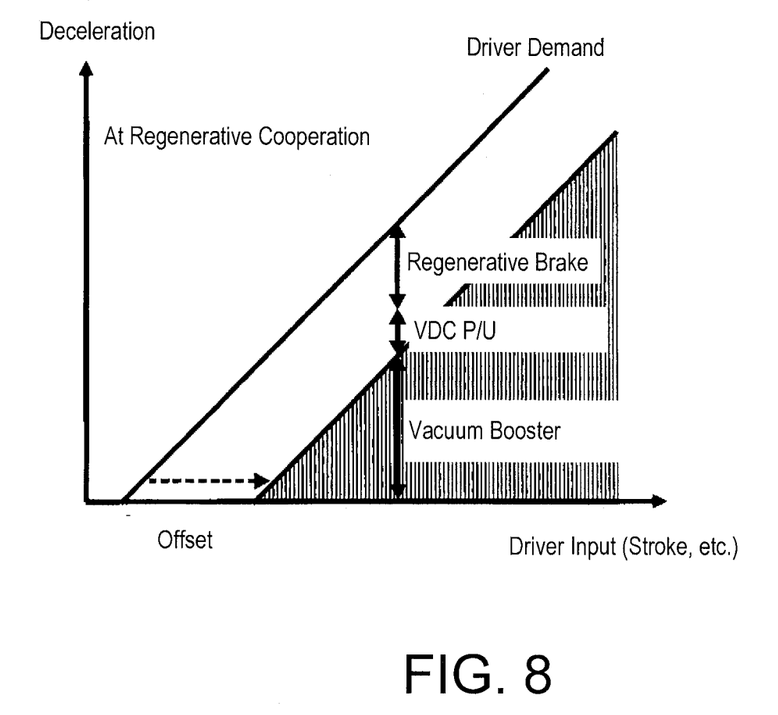
FIG. 8 is a deceleration characteristic diagram showing the relationship between driver input and deceleration at regenerative cooperative operation where the required deceleration by the driver is compensated for by vacuum booster, regenerative brake and VDC brake hydraulic pressure unit.

However, for example, due to the conditions such as vehicle speed or battery charge capacity and the like, a situation may occur in which the shortage of deceleration with respect to the driver's demand for deceleration cannot be met by the regenerative portion only. Thus, as shown in FIG. 8, the deceleration of driver demand is compensated for by the sum of vacuum booster (base fluid pressure portion), regenerative brake (regenerative portion) and VDC brake fluid pressure unit (add-on pressure portion).

Thus, a cooperative regeneration brake system using the VDC may be configured inexpensively by merely changing the vacuum booster characteristic, VDC brake fluid pressure unit characteristic, and adding a stroke sensor with respect to existing conventional VDC. The safety function of the conventional VDC will thus be expanded (safety function+regenerative cooperative function).

However, as a rebound of this functional enhancement, a new challenge arise to tackle, i.e., decrease in durability and reliability of VDC motor, due to increased frequency of operation and prolonged operation time of the VDC motor of the VDC brake fluid unit Further, within a region in which the driver input is small detectable by a brake pedal stroke, the vacuum booster (base fluid pressure portion) is zero, or is likely to be substantially zero, so that the deceleration of driver request will be compensated by regenerative brake (regenerative portion) and VDC brake fluid pressure unit (add-on portion).

Regenerative cooperative brake control operation will be now discussed when vehicle speed V≥first predetermined value (first predetermined vehicle speed). When vehicle speed V is equal to or greater than the first predetermined value (first predetermined vehicle speed), the VDC motor 21 in motor driven state, and the braking operation condition in step S11 is satisfied, the flow of control is repeated In the flowchart shown in FIG. 4 that advances in the order; step S1→step S3→step S11→step S12→step S13→step S14→step S15→return.

That is, in step S12, the target deceleration is calculated based on the brake pedal stroke and the second target deceleration calculation map (described within the framework or block of step S12), corresponding to the brake pedal stroke. In the next step S13, the base fluid pressure is determined based on MC pressure sensor value while the regenerative portion and add-on portion based on the vehicle speed sensor value, and a regenerative cooperative brake control calculation is performed by achieving the target deceleration by the total sum of base fluid pressure portion, regenerative portion, and add-on portion. In the next step S14, the fluid pressure command value corresponding to the add-on pressure portion is determined, and the fluid pressure command to obtain the fluid pressure command value is output to the brake controller 7. In this case, the regenerative brake force command value corresponding to the amount of regenerative portion is determined, if there is the regenerative portion required, the regenerative brake force command to obtain the regenerative brake force command value is output to the motor controller 8. In the next step S15, the VDC motor 21 is driven, and the regenerative cooperative brake control for generating the necessary deceleration is carried out by the sum of base fluid pressure portion, regenerative portion and add-on pressure portion.

Operation of motor stop control will now be discussed when the vehicle speed V<the first predetermined value (first predetermined vehicle speed). When the vehicle speed V becomes less than the first predetermined value (the first predetermined vehicle speed), the process proceeds to step S1→step S2. In the flowchart of FIG. 4, and at step S2, the VDC motor 21 is stopped to be driven. Once VDC motor 21 has become stopped driving, then unless the condition of vehicle speed in step S4 is satisfied (i.e., the vehicle speed V>the second predetermined value), in the flowchart of FIG. 4, the process repeats in line with step S1→step S3→step S4→step S5→return, and the VDC motor 21 is maintained to be stopped. In addition even if the vehicle speed related condition in step S4 is satisfied (i.e., the vehicle speed V>the second predetermined value), as long as the brake operating condition in step S6 is not established, the flow in FIG. 4, i.e. the flow of step S1→step S3→step S4→step S6→step S5→return is repeated, where the VDC motor 21 is maintained in the stopped state.

In this way, the VDC motor 21 operated at the same time as the braking operation is stopped when the vehicle speed V becomes less than the first predetermined value (the first predetermined vehicle speed). Therefore, the operating frequency and prolonged operating time of the VDC motor 21 may be reduced while improving the durability and reliability of the VDC motor 21.

Operation of regenerative cooperative brake control will now be discussed in the scene of braking operation accompanied by motor restart. After stopping the VDC motor 21, when a braking operation is conducted at the vehicle speed being at very low, if the vehicle speed condition in step S4 (i.e., the vehicle speed V>the second predetermined value) and braking operation condition in step S6 are respectively satisfied, in the flowchart of FIG. 4, the process proceeds along step S1→step S3→step S4→step S6→step S7→step S8→step S9→step S10.

That is, in step S7, the target deceleration is calculated corresponding to the brake pedal stroke based on the brake pedal stroke and the first target deceleration calculation map (described within the framework of the step S7). In step S8, the base fluid pressure is determined based on the MC pressure sensor value, the regenerative portion and add-on pressure portion are determined based on the vehicle speed sensor value, and the regenerative cooperative brake control calculation is conducted to attain the target deceleration by the sum of base fluid pressure portion, regenerative portion and add-on pressure portion. In step S9, the fluid pressure command value corresponding to the add-on pressure is determined and the fluid pressure command to obtain the fluid pressure command value is output to the brake controller 7. In this case, if there is a regenerative portion necessary, the regenerative brake force command value corresponding to the amount of regenerative portion is determined and the regenerative brake force command to obtain the regenerative brake force command value is output to the motor controller 8. In step S10, the VDC motor 21 is restarted to drive, and the regenerative cooperative brake control for generating the deceleration required by the sum of base fluid pressure portion, regenerative portion and add-on pressure portion.

In this case, a comparative example is prepared in which only a single map is available for setting the target deceleration and even at a slow or gentle braking operation accompanied by motor restart, the brake control sets the normal target deceleration the driver requires. In the following, the operations are compared and described when the same scene of slow braking operation with motor restart is encountered by the vehicle with brake control device by the Comparative Example and the hybrid vehicle equipped with brake control device according to the first embodiment.

Figure 9A:
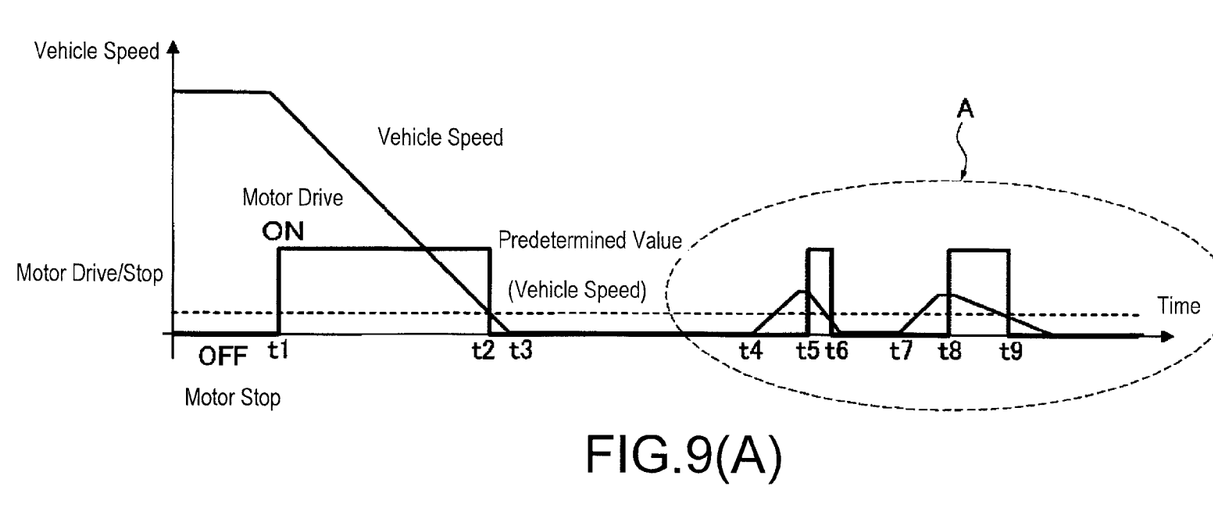
FIGS. 9(A) and 9(B) are time charts showing respective characteristics in vehicle speed, motor drive/stop and deceleration target value/deceleration actual value when the vehicle with a brake control device in the comparative example transitions from the stopped state to an extremely low speed with slow braking operation.

Here, the scene involving the slow, gentle or gradual braking operation is now explained. During vehicle running, as shown in FIG. 9(A), braking operation is started to drive at time t1 and pumping motor is driven to operate. At time t2, the vehicle speed reaches a predetermined value and the driving of pumping motor is stopped or suspended, and immediately thereafter the vehicle stops at time t3. Then, at time t4 after the stop of driving of pumping motor, the pumping motor is allowed to be reactivated due to the vehicle starting to travel at very low speed due to creeping torque or the like and then slow or gradual brake operation is carried out at time t5. The slow or gradual depression of brake is carried out at time t5 and pumping motor is allowed to operate. Subsequently, at time t6, the vehicle speed reaches a predetermined value and the pumping motor will be stopped. Further, after the stop of pumping motor driving, at time t7, in response to start up again via creeping torque and the like, at time t8, a gradual braking operation is performed together with driving of pumping motor. Finally, at time t9 at which the vehicle speed attains the predetermined value, the pumping motor will be stopped to operate. These relate to the scenes in which the gradual or slow braking is involved.

Figure 9B:
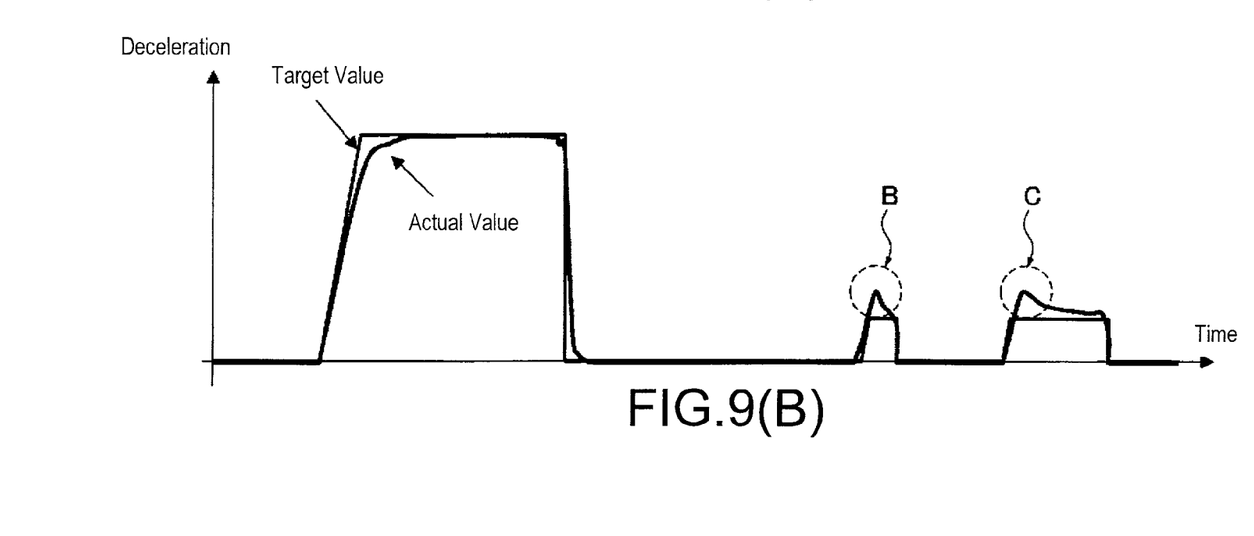

Of these scenes, as shown in the time-domain characteristics by arrow A in FIG. 9(A), gentle braking operations are carried out at time t5 and time t8. Although the braking operation amount is small, as shown in FIG. 9(B), a normal target deceleration of driver's request is set. Therefore, in order to ensure an add-on pressure portion, although the rotation speed of the pumping motor transitions to the target rotation speed of larger value from 0, at this time, the rotation speed of the pumping motor over-speeds temporarily. For this reason, the actual hydraulic or fluid pressure by the add-on pressure portion shows an overshoot with respect to the driver requested fluid pressure, and as shown by arrows B, C in FIG. 9(B), a deceleration overshoot occurs in which the actual deceleration value greatly exceeds the target value. Consequently, an awkward brake feeling (discontinuous brake) is encountered.

Figure 10:
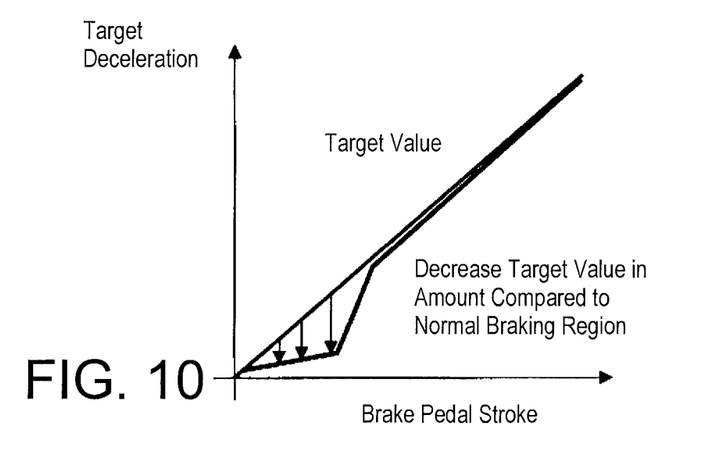
FIG. 10 is a target deceleration map against brake pedal stroke when restarting a pumping motor in response to a braking operation in the hybrid vehicle equipped with brake control device of the first embodiment.

In contrast, in the first embodiment, as shown in the time-domain characteristics of arrow A in FIG. 9(A), when a braking operation is performed slowly at both time t5 and time t8, and the VDC motor 21 has been started from the stopped state, the value of the target deceleration is set lower in advance than the value of the target deceleration which the driver requires as shown in FIG. 10. Therefore, out of the base fluid pressure portion and regenerative portion, both are intended to share the target deceleration, the share or apportion of deceleration by the add-on pressure portion will be relatively reduced with the target rotation speed of VDC motor 21 decreased. Specifically, the base fluid pressure portion becomes substantially zero (see FIG. 8). In addition, at low vehicle speed region, the regenerative portion can hardly be expected. That is, when decreasing the target deceleration, the deceleration sharing apportion of the fluid pressure due largely to the add-on pressure portion is reduced. Then, the add-on pressure portion will be obtained by control of the differential pressure valve (the first M/C cut of solenoid valve 25, the second M/C cut solenoid valve 26) and a pump-up boost by hydraulic or fluid pumps 22 and 22. Therefore, when the add-on pressure portion is lowered, the pump up width or range is in turn smaller, and the target rotation speed of the VDC motor 21 that drives hydraulic pump 22, 22 is made lower.

Figure 11:
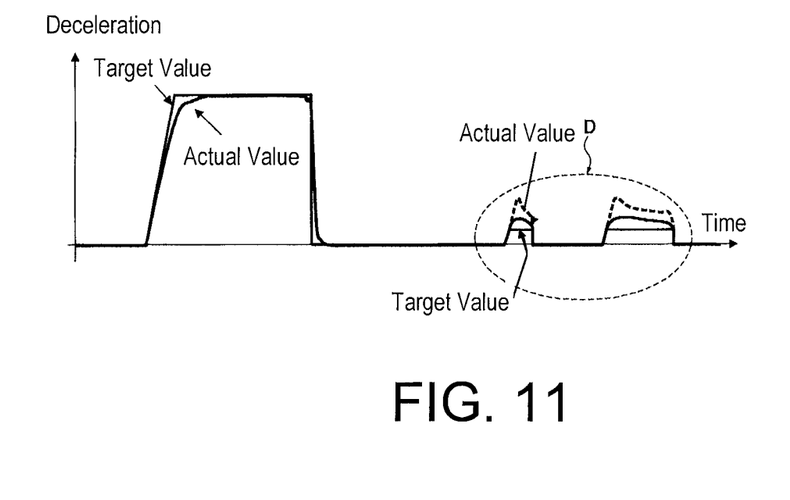
FIG. 11 is a time chart showing a respective characteristics in deceleration target value and actual value when the vehicle with a brake control device in the first embodiment transitions from the stopped state to an extremely low speed with slow braking operation.

Therefore, according to the first embodiment, as shown in time-domain characteristics shown by an arrow D in FIG. 11, the occurrence of deceleration overshoot in which the deceleration (actual value) sharply increases owing to the transitional over-speed of VDC motor 21 is prevented to occur. Consequently, the actual deceleration of the vehicle may be controlled to the target deceleration (target deceleration in FIG. 9(B)) equivalent to that the driver requires. Therefore, when generating brake force by restarting the VDC motor that has been stopped, the awkward brake feeling is suppressed and the braking is now easy to handle.

In the first embodiment, the target deceleration is reduced to assume the value by subtracting from the target deceleration value which the driver requests at least a portion, i.e. a range of reduction corresponding to the overshoot of the actual deceleration caused by excessive rotation of at least the VDC motor 21. That is, in view of the portion or the range of reduction considering the occurrence of actual deceleration by overshooting of the motor rotation, the actual value of deceleration approximately matches the target value of the deceleration that should be originally intended at the time of restarting the motor. Therefore, while generating the vehicle deceleration that the driver requests, the discontinuous brake feel may be suppressed and the braking feeling will thus be improved.

In the first embodiment, the target deceleration value is determined by the first target deceleration calculation map based on a brake pedal stroke as parameter, and the first target deceleration calculation map is further defined by decreasing by a range of reduction such that the target deceleration value is smaller in the first target deceleration calculation map at brake pedal being less than a predetermined value than a second target deceleration calculation map characteristic that is used at the vehicle speed being equal to or greater than the first predetermined value (the first predetermined speed). That is, the target deceleration is set at the characteristic that is reduced by a range of reduction at gentle braking operation. At a sharp braking, the target deceleration is set at the characteristic that represents the deceleration of driver request. Therefore, when restarting the motor, suppression of discontinuous brake feeling at gentle braking may be made compatible with ensuring the responsiveness of the demand for deceleration in response to sharp braking operation.

Next, a description will be given of technical effects. In the brake control device of the hybrid vehicle in the first embodiment, the following effects are obtained.

(1) The first embodiment is provided with: a master cylinder 13 that generates a master cylinder pressure in accordance with a braking operation; a wheel cylinder 4FL, 4FR, 4RL, 4RR that is disposed at each front and rear wheel and supplies a hydraulic pressure brake force to each wheel; a brake hydraulic pressure actuator (the VDC brake fluid pressure unit 2) that is interposed between the master cylinder 13 and the wheel cylinder 4FL, 4FR, 4RL, 4RR, and is provided with a hydraulic pressure pump 22, 22 driven by a pumping motor (the VDC motor 21) and a differential valve (the first M/C cut solenoid valve 25, the second M/C cut solenoid valve 26) for controlling the pressure difference between the wheel cylinder pressure and master cylinder pressure when the pumping motor (the VDC motor 21) is in operation; a regenerative brake force control unit (the motor controller 8) that is connected to an electric drive motor 5 coupled to the drive wheel and controls the regenerative brake force that is generated by the electric drive motor 5; a regenerative cooperative brake control unit (the integrated controller 9, FIG. 4) that achieves the target deceleration at the braking operation by the sum of the base hydraulic pressure portion by a master cylinder pressure and the regenerative portion by a regenerative brake force, and further compensates for the shortage of the regenerative portion by an add-on pressure portion by the brake hydraulic pressure actuator (the VCD brake fluid pressure unit 2); a motor stop control unit (step S1 to step S2, FIG. 4) that stops the pumping motor (the VDC motor 21) to operate when the vehicle speed falls below a first predetermined vehicle speed; a motor restart control unit (steps S4 to S10, FIG. 4) that sets the target deceleration value lower than the target deceleration of driver's request (step S7) and restarts the pumping motor (the VDC motor 21) when the vehicle speed exceeds a second predetermined vehicle speed (the second predetermined value) (if YES in step S4) and brake is operated (YES in step S6) while the pumping motor (the VDC motor 21) is in a stopped state (OFF in step S3). Therefore, when generating the brake force by restarting the pumping motor (the VDC motor 21) that has been stopped, the discontinuous brake feeling may be suppressed with improving for an easier brake feeling.

(2) The motor restart control unit or process (step S4 to step S10 in FIG. 4) sets the target deceleration value by subtracting from the target deceleration value which the driver requests at the vehicle speed V exceeding the first vehicle speed (first predetermined value) at least a portion corresponding to the overshoot of the actual deceleration caused by excessive rotation of the pumping motor (the VDC motor 21) (step S7). Therefore, in addition to the above described effect (1), while generating the vehicle deceleration that the driver requests, the discontinuous brake feel may be suppressed and the braking feeling will thus be improved.

(3) The motor restart control unit or process (step S4 to step S10 in FIG. 4) sets the characteristics of the target deceleration in such a way that the target deceleration value is determined by a target deceleration calculation map (a first target deceleration calculation map) based on a brake pedal operation amount (brake pedal stroke) as parameter, and the target deceleration calculation map (the first target deceleration calculation map) is further defined by decreasing by a range of reduction such that the target deceleration value is smaller in the first target deceleration calculation map at brake pedal operation amount (brake pedal stroke) being less than a predetermined value than the characteristic of a target deceleration calculation map (a second target deceleration calculation map) that is used at the vehicle speed being equal to or greater than the first predetermined vehicle speed (the first predetermined value). Therefore, in addition to the technical effects of (1) and (2) above, when restarting the pumping motor (the VDC motor 21), suppression of discontinuous brake feeling at gentle braking may be made compatible with ensuring the responsiveness of the demand for deceleration in response to sharp braking operation.

Although the brake control system of the electric vehicle according to the present invention has been described above with reference the first embodiment, the specific configuration is not limited, and design changes and additions are allowed without departing from the spirit of the present invention according to each claim.

In the first embodiment, an example is shown in which the second predetermined value (the second predetermined vehicle speed) in step S4 is set greater than the first predetermined value (first predetermined vehicle speed) so that an example of prevention of ON/OFF hunting of the VDC motor 21. However, the first predetermined value (first predetermined vehicle speed) may be the same as the second predetermined value (second predetermined vehicle speed). Moreover, even when the first predetermined value (first predetermined vehicle speed) is greater than the second predetermined value (second predetermined vehicle speed), the motor restarting control will be established.

In the first embodiment, when generating brake force by restarting the VDC motor 21 at stopped state, an example is shown by using a target deceleration calculation map. However, the target deceleration may also be calculated to generate the brake force by restarting the pumping motor in stopped state by an arithmetic process in which a predetermined correction amount will be subtracted from the target deceleration obtained from the normal target deceleration map when the conditions regarding vehicle speed and braking operation are established after the pumping motor has been stopped.

In the first embodiment, an example is shown in which the VDC motor 21 is made ON at the same time of a braking operation, and made OFF at vehicle stopped region. However, out of the entire deceleration region of braking operation, such a motor ON/OFF control may be an alternatively in which the VDC motor may be made OFF in the region in which no add-on portion is required.

In the first embodiment, an example is shown in which a VDC brake hydraulic or fluid pressure actuator shown in FIG. 2 is used. However, such a brake fluid pressure may suffice as long as provided with a fluid pressure pump driven by VDC motor, a differential pressure valve that controls the differential pressure between the wheel cylinder pressure and master cylinder pressure.

In the first embodiment, an example of application of the brake control device of the present invention to a front-wheel drive hybrid vehicle is shown. However, the brake control device of the present invention will be able to be applied to an electric vehicle hybrid vehicle of rear-wheel drive, electric vehicle, fuel cell vehicle, etc. as long as a brake regenerative cooperative control of the hydraulic pressure with regenerative brake force is performed.

The invention claimed is:

1. A vehicle brake control device for an electrically driven vehicle, comprising:
a master cylinder that generates a master cylinder pressure in accordance with a braking operation;
a front wheel cylinder disposed at a front wheel to supply a hydraulic pressure braking power to the front wheel;
a rear wheel cylinder disposed at a rear wheel to supply a hydraulic pressure braking power to the rear wheel;
a brake hydraulic pressure actuator interposed between the master cylinder and the front and rear wheel cylinders, and the brake hydraulic pressure actuator including a hydraulic pressure pump driven by a pumping motor and a differential valve for controlling the pressure difference between a wheel cylinder pressure of the front and rear wheel cylinders and the master cylinder pressure during operation of the pumping motor;
a regenerative brake force control unit connected to an electric drive motor that is coupled to a drive wheel that is one of the front and rear wheels, the regenerative brake force control unit controlling a regenerative brake force that is generated by the electric drive motor; and
a regenerative cooperative brake control unit that calculates a target deceleration of a driver's request and outputs a regenerative braking command to the regenerative brake force control unit and a fluid pressure command to a brake control unit of the brake hydraulic pressure actuator to achieve the target deceleration during the braking operation, the regenerative cooperative brake control unit calculating a sum of a base hydraulic deceleration portion derived from of the master cylinder pressure and a deceleration portion derived from the regenerative brake force, and further compensating for a shortage of the regenerative deceleration portion in the sum to achieve the target deceleration by an add-on deceleration portion generated by the brake hydraulic pressure actuator, the regenerative cooperative brake control unit stopping the pumping motor from operating upon determining the vehicle speed has fallen below a first predetermined vehicle speed value, the regenerative cooperative brake control unit setting a target deceleration value that is lower than the target deceleration and restarting the pumping motor upon determining the vehicle speed exceeding a second predetermined vehicle speed value and the braking operation is occurring while the pumping motor is in a stopped state as a result of the vehicle speed falling below the first predetermined vehicle speed value.

2. The vehicle brake control device as claimed in claim 1, wherein
the regenerative cooperative brake control unit sets the target deceleration value by subtracting from the target deceleration at the vehicle speed exceeding the first predetermined vehicle speed value at least a portion corresponding to an overshoot of an actual deceleration caused by an excessive rotation of the pumping motor.

3. The vehicle brake control device as claimed in claim 1, wherein
the regenerative cooperative brake control unit determines the target deceleration value that is lower than the target deceleration based on a brake pedal operation amount during the braking operation using a first target deceleration calculation map, where the first target deceleration calculation map is defined by the target deceleration value in the first target deceleration calculation map being smaller for values of the brake pedal operation amount that are less than a predetermined value than in a second target deceleration map that is used while the vehicle speed is equal to or greater than the first predetermined vehicle speed.

4. The vehicle brake control device as claimed in claim 2, wherein
the regenerative cooperative brake control unit determines the target deceleration value that is lower than the target deceleration based on a brake pedal operation amount during the braking operation using a first target deceleration calculation map, where the first target deceleration calculation map is defined by the target deceleration value in the first target deceleration calculation map being smaller for values of the brake pedal operation amount that are less than a predetermined value than in a second target deceleration map that is used while the vehicle speed is equal to or greater than the first predetermined vehicle speed.

* * * * *